United States Patent Office 2,938,308
Patented May 31, 1960

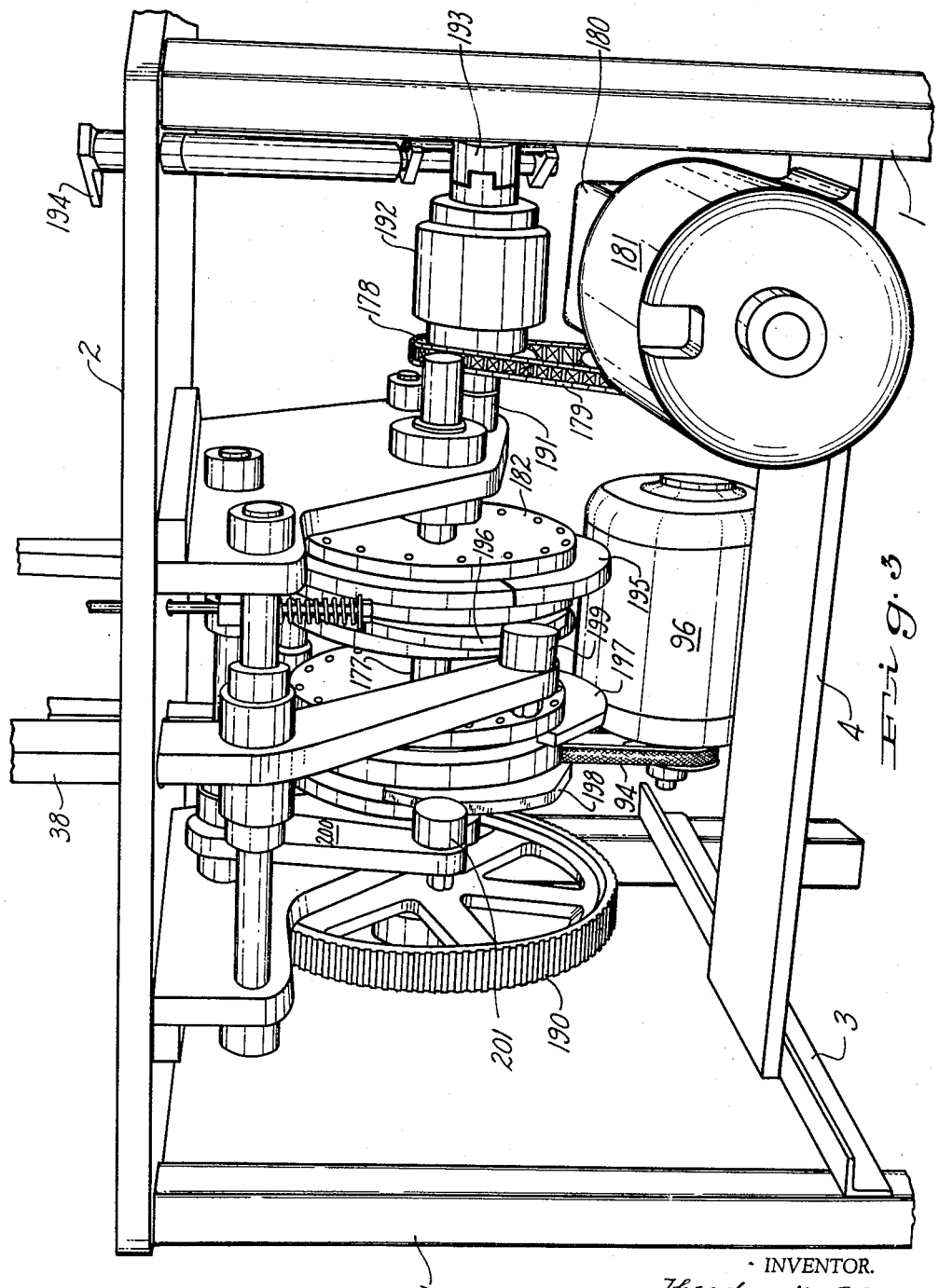

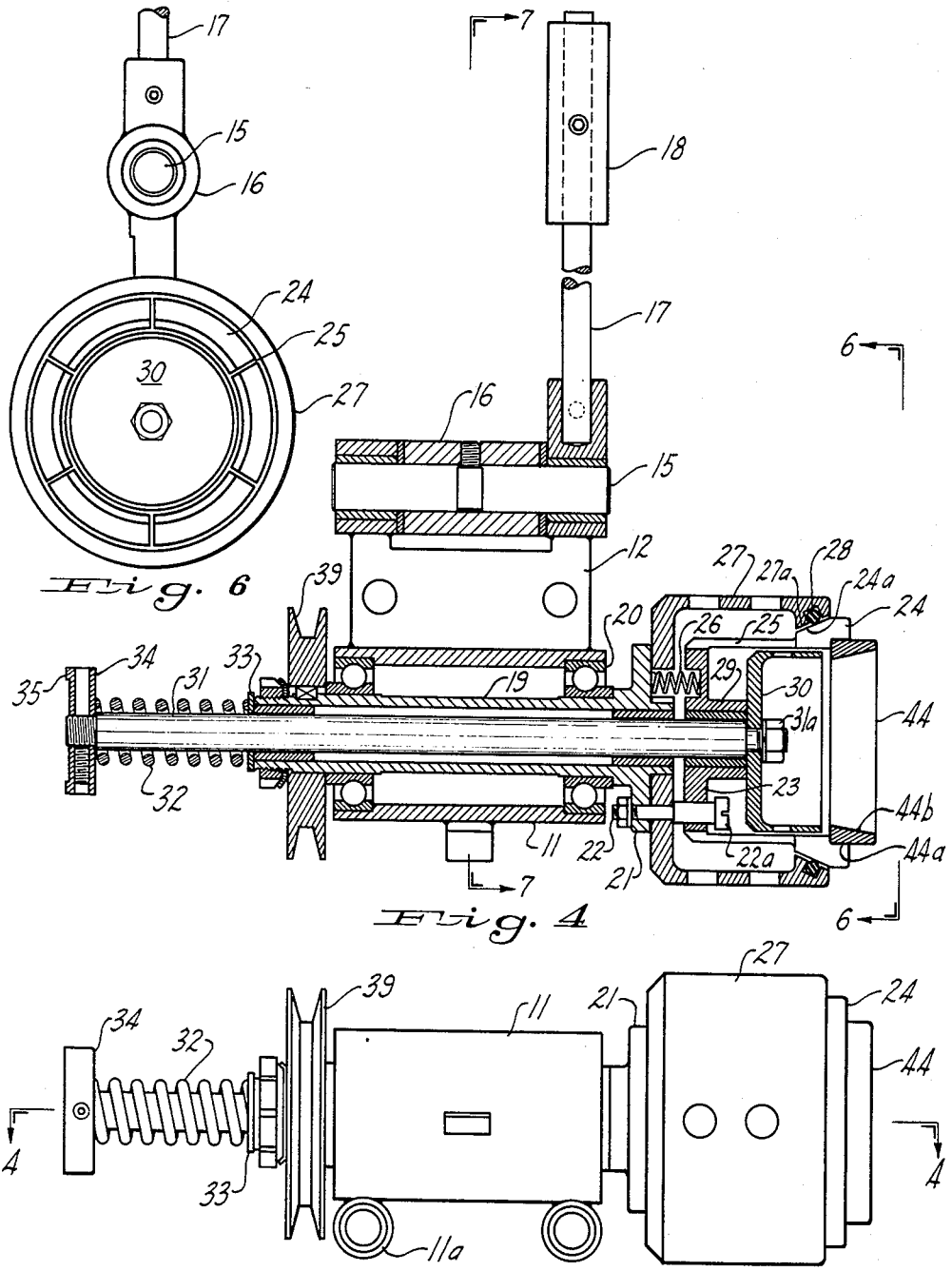

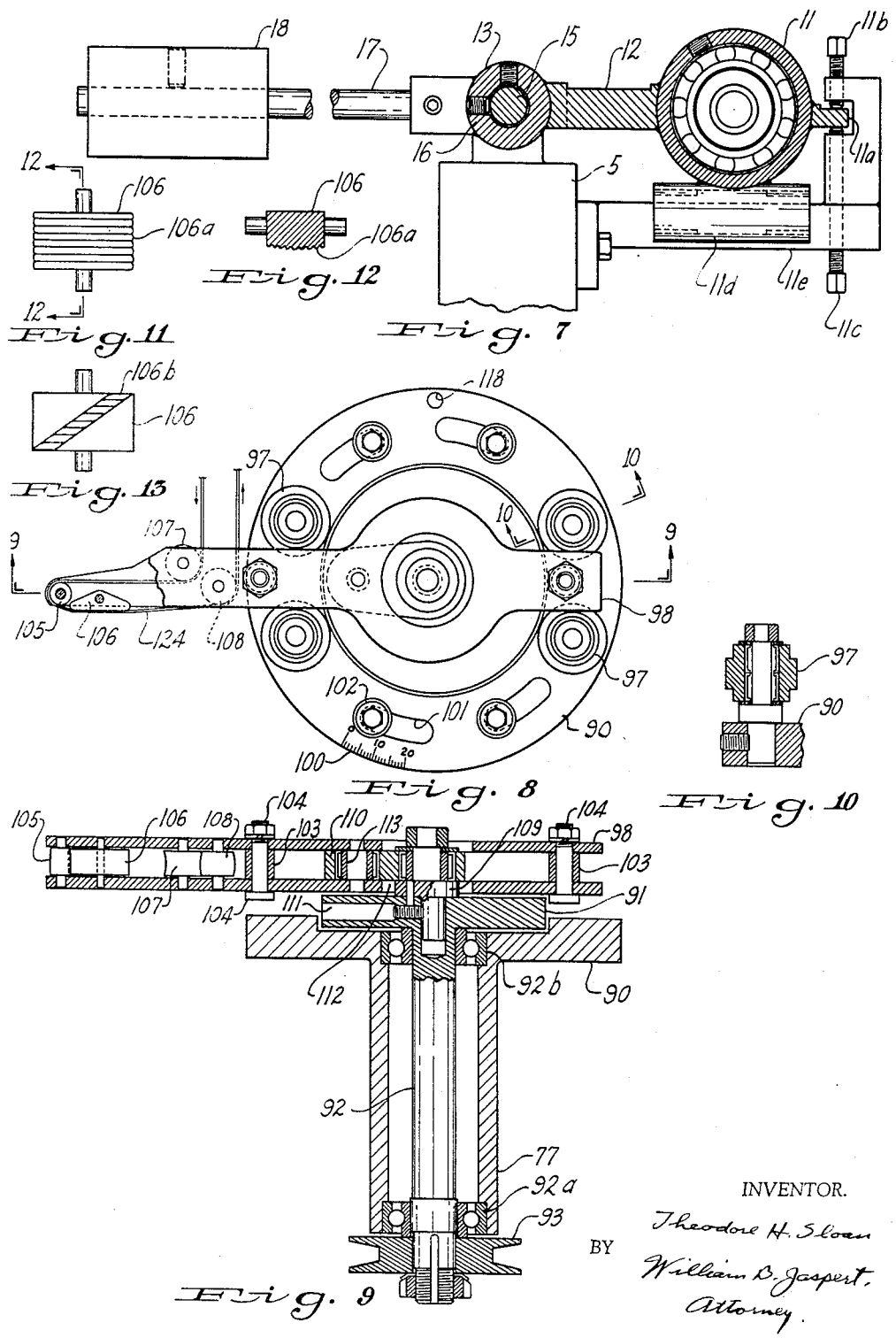

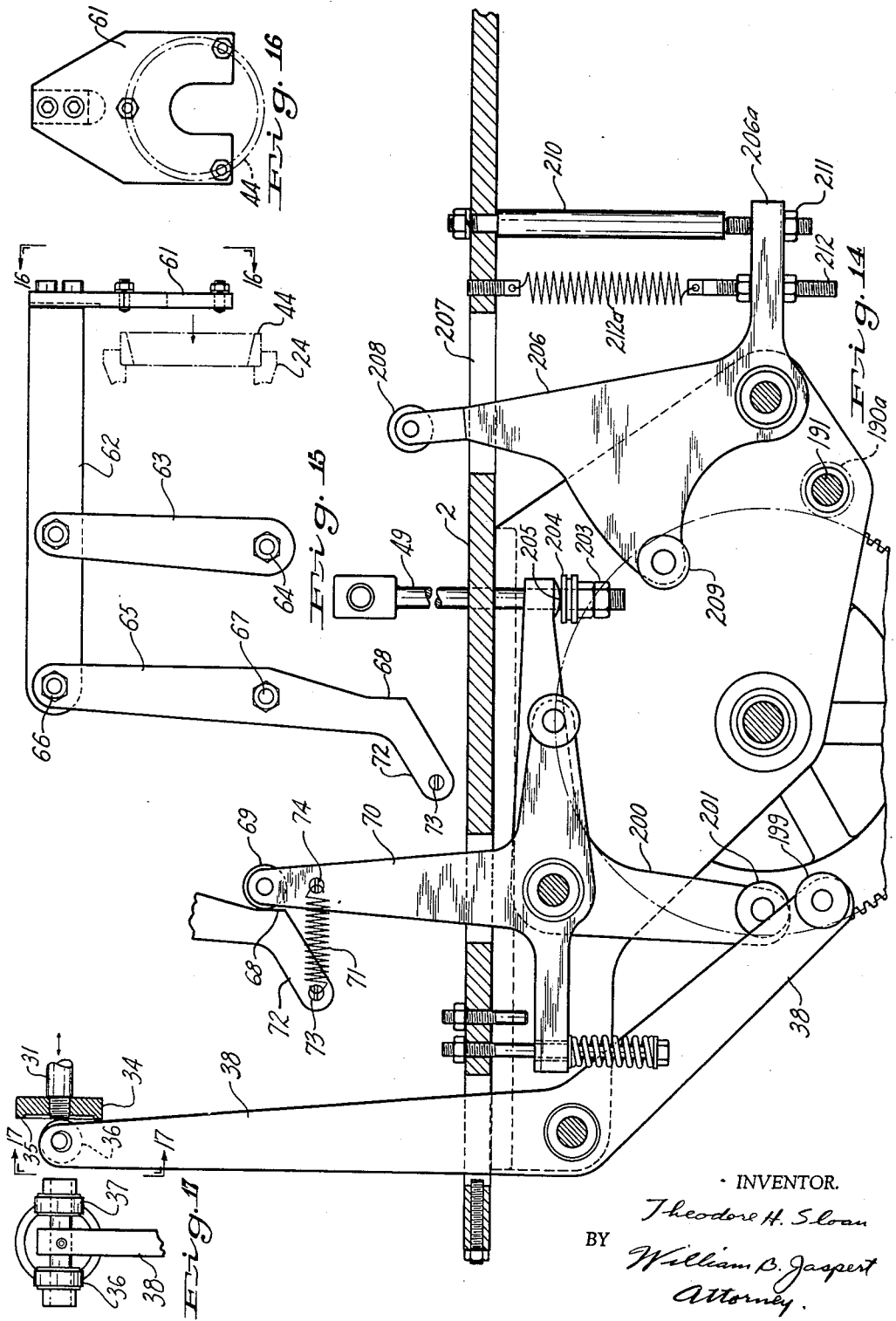

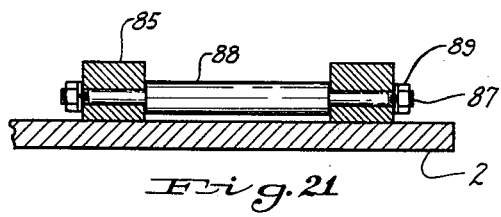
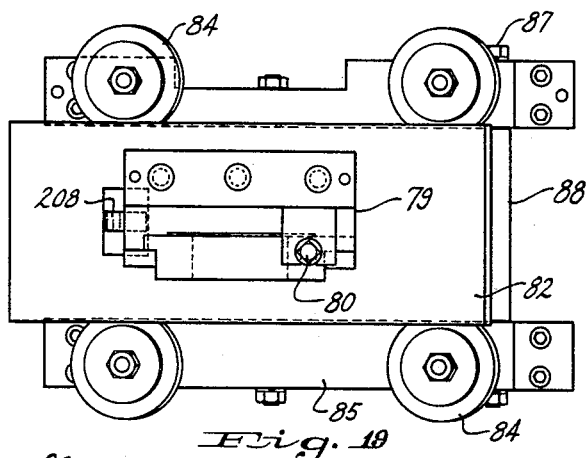
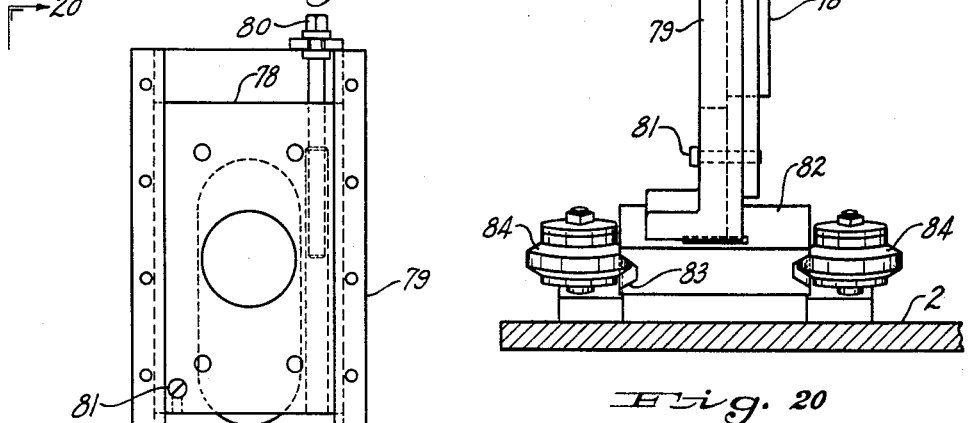
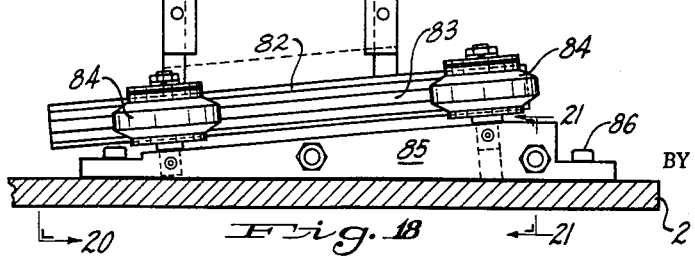
INVENTOR.
Theodore H. Sloan
BY William B. Jasper
Attorney

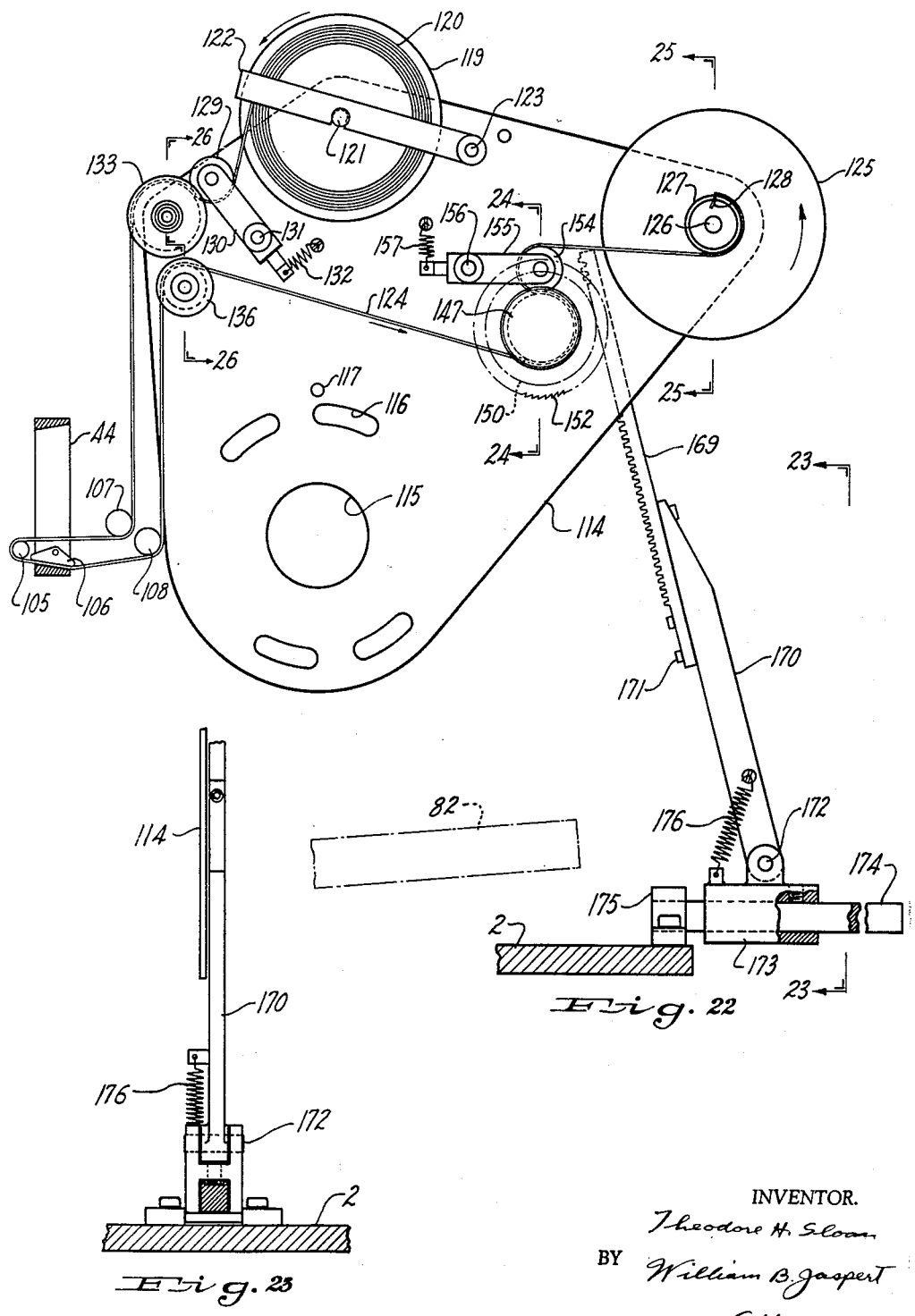

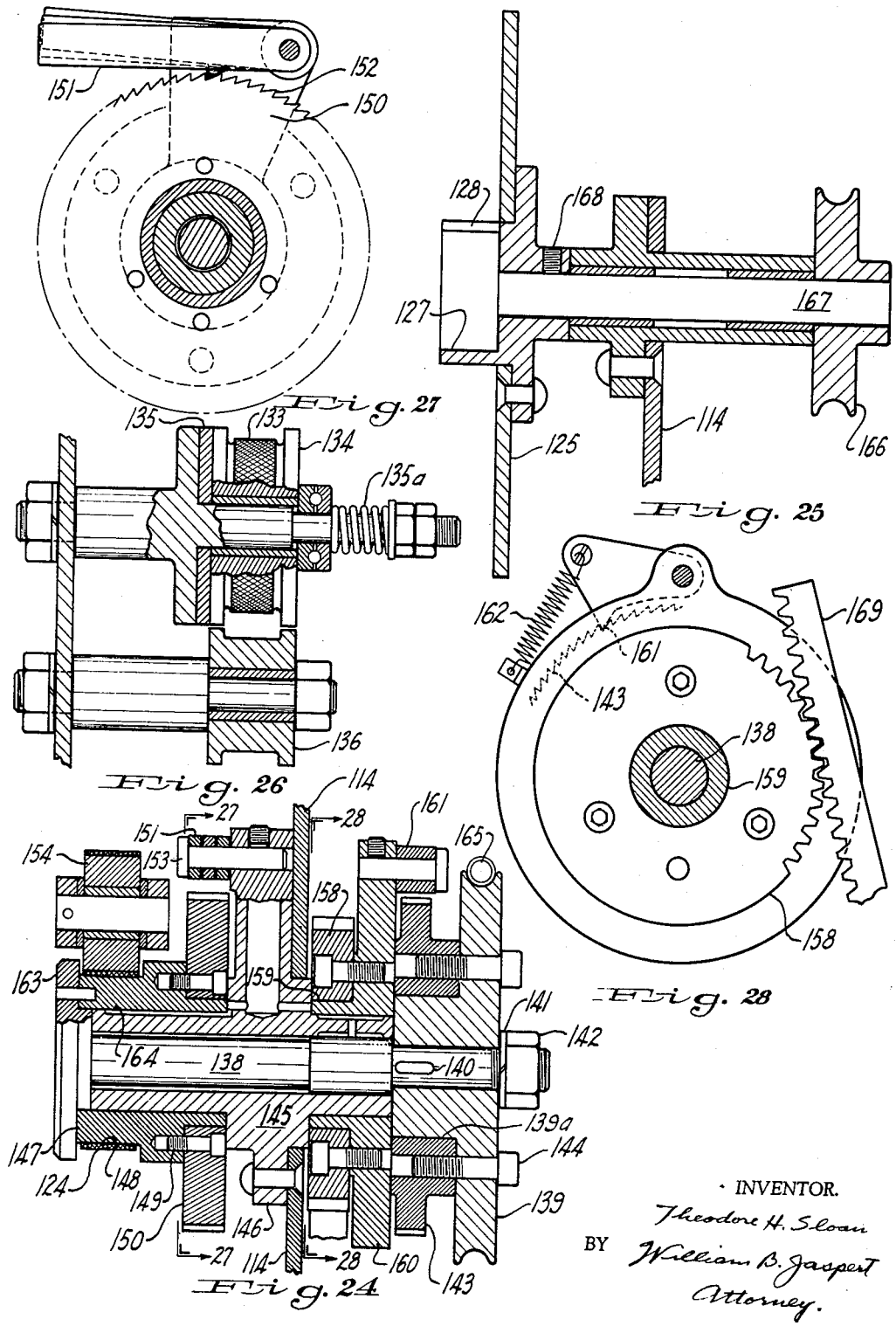

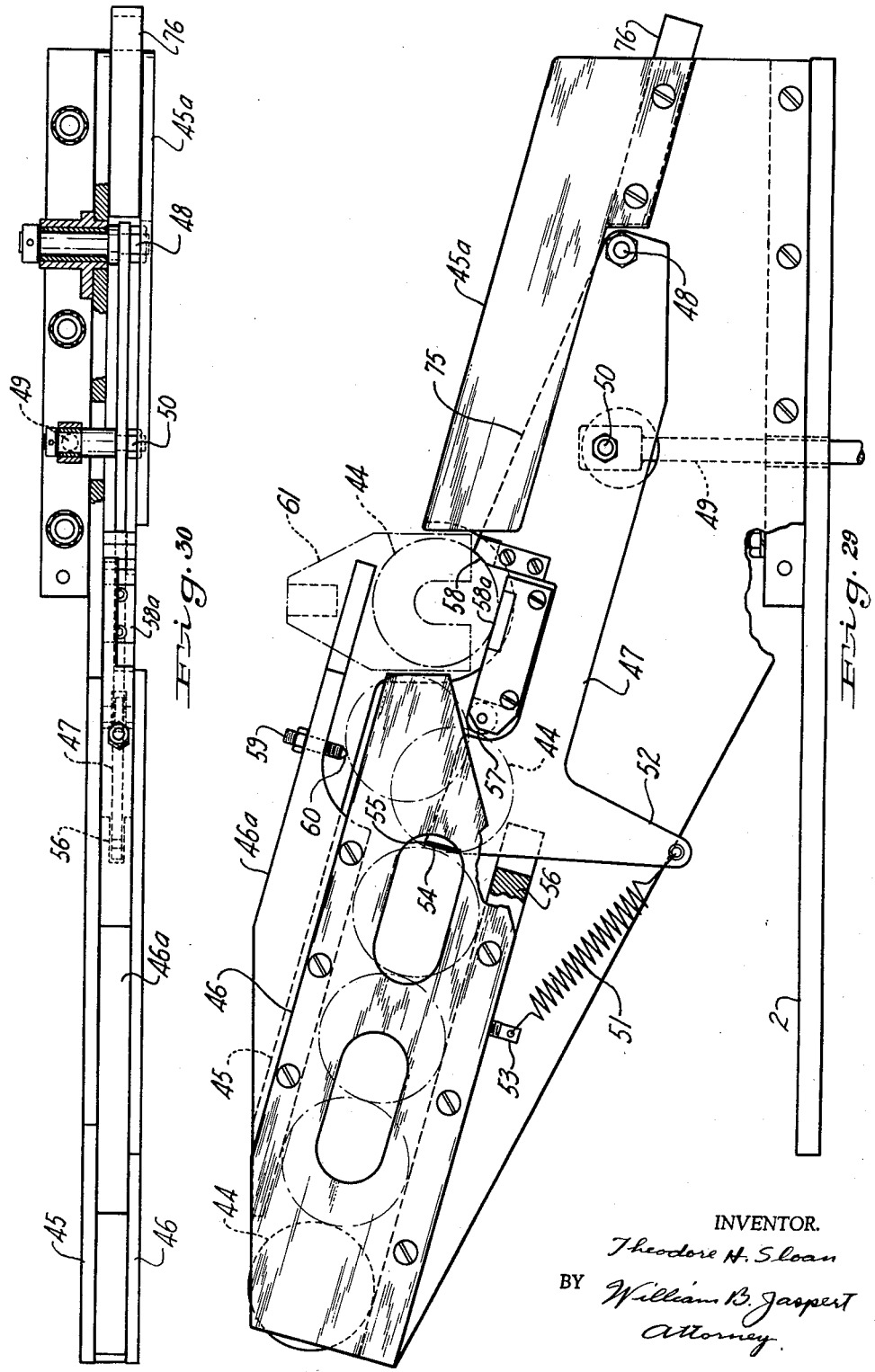

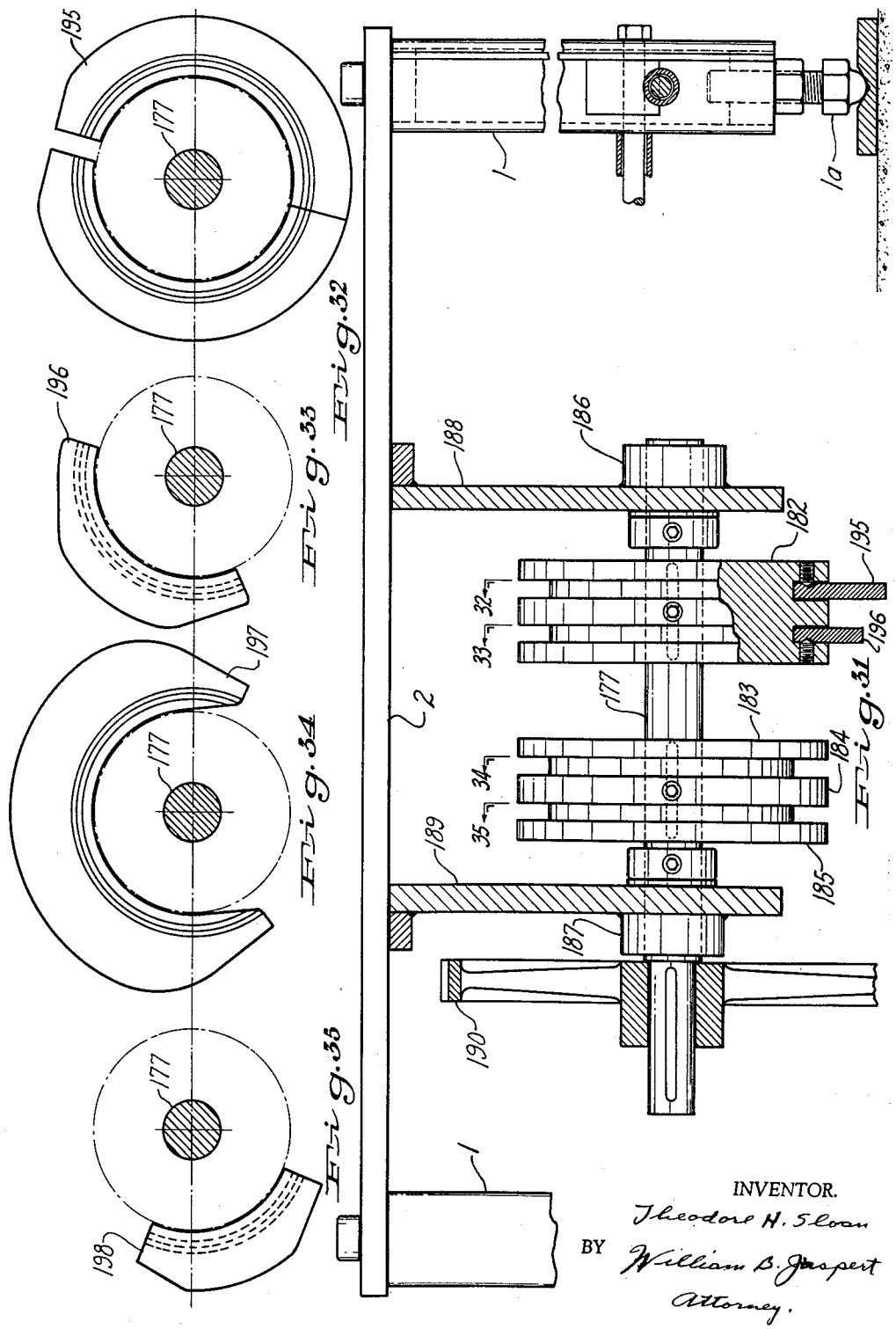

2,938,308

MACHINES FOR HONING PARTS OF ANTI-FRICTION BEARINGS AND THE LIKE

Theodore H. Sloan, Charleroi, Pa., assignor of twenty-five percent to William B. Jaspert, Pittsburgh, Pa.

Filed Sept. 8, 1958, Ser. No. 759,798

16 Claims. (Cl. 51—135)

This invention relates to new and useful improvements in honing machines utilizing an abrasive faced tape or the like for honing the previously ground or machine finished surfaces such as cups for roller bearings and the like, and it is among the objects of the invention to provide a tape honing machine in which the cups are held by a chuck during the honing operation and to which they are automatically fed and from which they are automatically ejected.

It is a further object of the invention to provide a tape honing machine of the above-designated character in which spooled tape having an abrasive surface is brought into contact with the surface to be honed, and in which the tape surface is automatically renewed for honing each successive cup as it is fed toward and away from the gripping chuck.

It is a further object of the invention to provide a tape honing machine of the above-designated character in which the abrasive surface of the tape is pressed against the bearing surface of the cup by means of a self-aligning shoe that is mounted to be subject to shuttle movement across the face of the bearing surface of the cup by mechanism that is mounted to bring the shoe and abrasive tape in contact by radial movement after which the shoe and tape are subjected to linear or axial movement across the face of the bearing surface.

It is a further object of the invention to provide a honing machine for roller bearing cups of the above-designated character in which the honing tape has a surface of abrasive material on one side and in which the honing shoe is provided with guide means for tracking the tape, the tape being mounted on reels or spools in a manner to be moved in predetermined increments to replace the abrasive surface beneath the honing shoe for each successive contact with the bearing surface to be honed.

It is another and primary object of this invention to provide a tape honing machine in which the tape is passed around guide rollers and under a honing shoe mounted for shuttle movement at right angles to the path of movement of the tape to and from the feed mechanism and in which the distance of the shoe from the guide rollers is such that there is very little change in tension on the tape when the shoe is subject to reciprocatory movement.

It is still a further and primary object of this invention to provide a honing machine capable of producing a low micro-inch surface substantially less than any heretofore obtained by the use of stone honing methods and which is capable of reducing the irregularities and of changing the surface texture to remove surface imperfections caused by grinding.

It is a further object of this invention to provide a predetermined cross hatched surface finish for roller bearings by honing with abrasive faced tape to induce silence at high speed operation.

These and other objects of the invention will become more apparent from a consideration of the accompanying drawings constituting a part hereof in which like reference characters designate like parts and in which.

Figure 1:
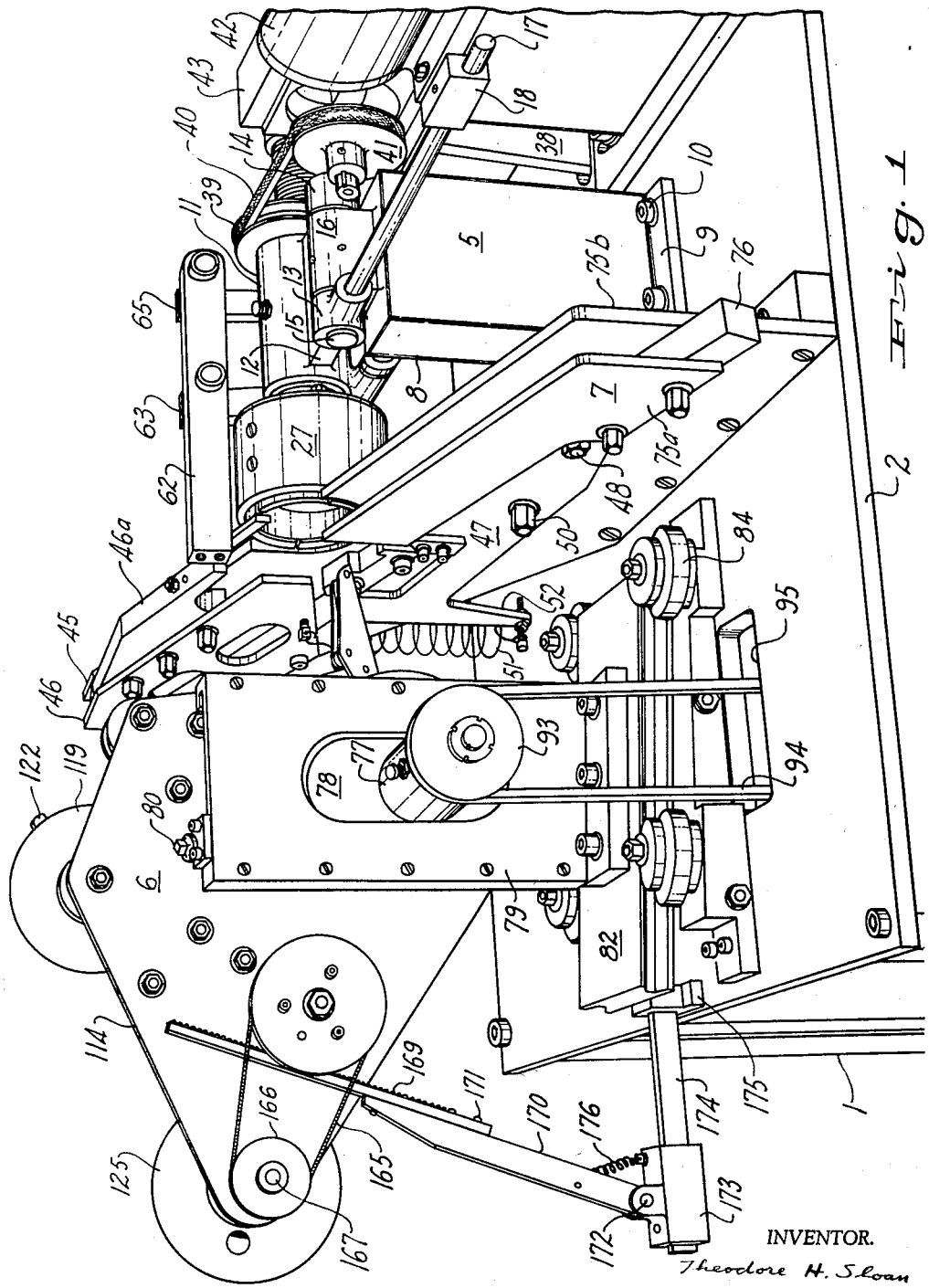
Figure 1 is an isometric view of the back of a tape honing machine for honing roller cups embodying the principles of this invention.
Figure 2:
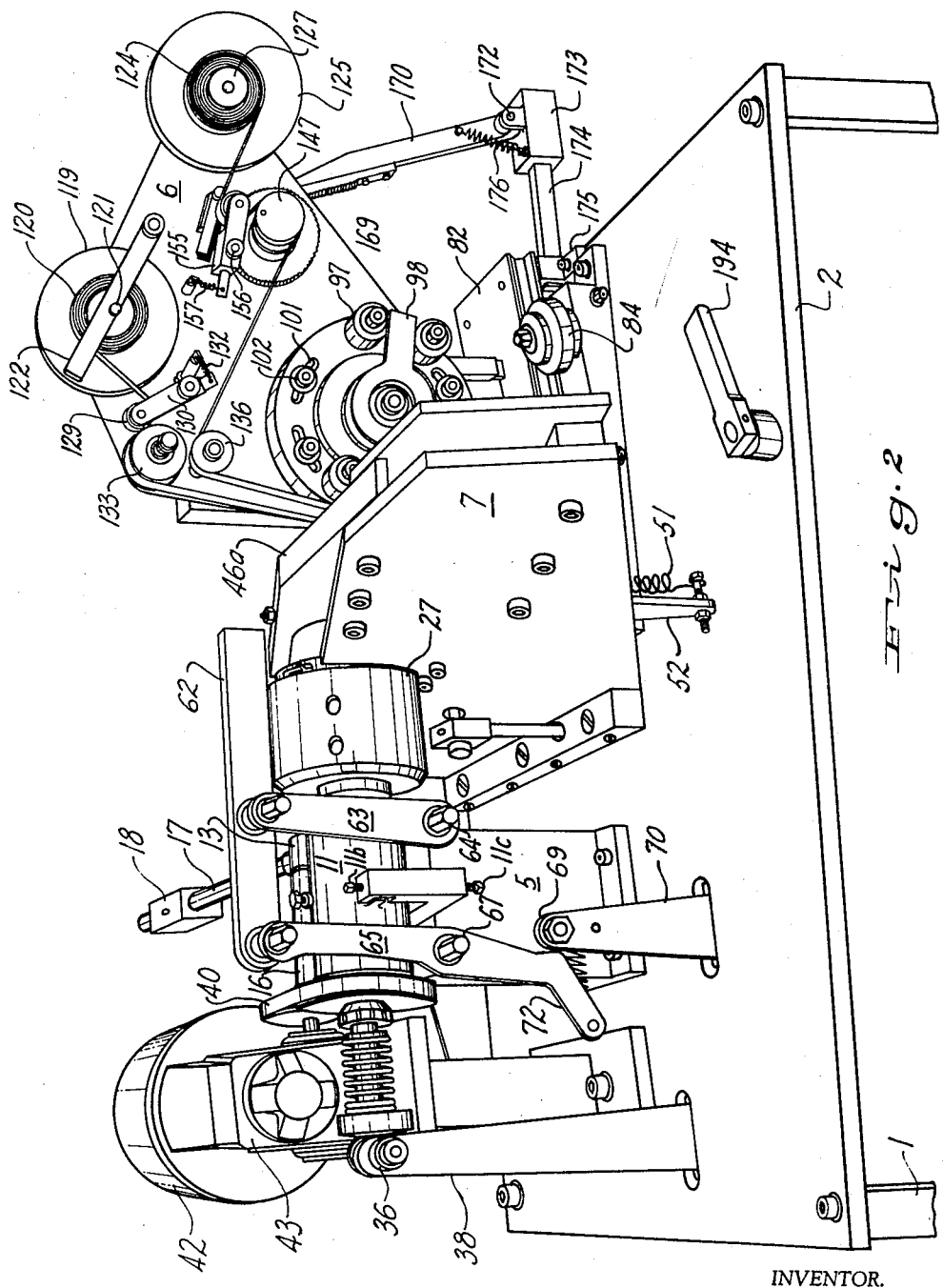
Figure 2 is a similar view of the front of the machine.

Figure 3, a view in perspective of a drive mechanism for the machine shown in Figures 1 and 2;

Figure 4 is a vertical section, partially in elevation, of a spindle and chuck mechanism taken along the line 4—4, Figure 5;

Figure 5, a top plan view of the spindle shown in Figure 4;

Figure 6, a front elevational view taken along the line 6—6, Figure 4;

Figure 7, a cross-sectional view, partially in elevation and partly broken away, taken along the line 7—7, Figure 4;

Figure 8, a front elevational view of the honing head and shuttle;

Figure 9 a longitudinal section through the honing head and shuttle taken along the line 9—9, Figure 8;

Figure 10, a cross-section of a guide roller mounted in the honing head taken along the line 10—10, Figure 8;

Figure 11, a bottom plan view of a honing shoe;

Figure 12, a vertical section through the honing shoe taken along the line 12—12, Figure 11;

Figure 13, a bottom plan view of a modified form of honing shoe;

Figure 14, a side elevational view of a portion of a cam and drive mechanism;

Figure 15, a side elevational view of a loading paddle feed mechanism;

Figure 16, an end view of the loading paddle taken along the line 16—16, Figure 15;

Figure 17, a rear elevational view of the thrust plate and pressure wheels on the chuck spindle taken along the line 17—17 of Figure 14;

Figure 18, a front elevational view of the honing head mount and slide support;

Figure 19 a top plan view thereof;

Figure 20 an end elevational view taken along the line 20—20 of Figure 18;

Figure 21, a vertical section of an adjustable roller support taken along the line 21—21 of Figure 18;

Figure 22, a side elevational view of a mounting plate for the honing tape reels and feed mechanism;

Figure 23, an end elevational view of a gear rack support taken along the line 23—23, Figure 22;

Figure 24, a cross-sectional view, partially in elevation, of the honing tape feed mechanism taken along the line 24—24, Figure 22;

Figure 25, a cross-sectional view, partially in elevation, of a rewind reel taken along the line 25—25, Figure 22;

Figure 26, a cross-sectional view, partially in elevation, of a tape drag mechanism taken along the line 26—26, Figure 22;

Figure 27, a view of a pawl and ratchet mechanism taken along the line 27—27, Figure 24;

Figure 28, a side elevational view of a feed wheel and ratchet mechanism taken along the line 28—28, Figure 24;

Figure 29, a front elevational view of a center board feeder;

Figure 30, a top plan view, partially in section, of the feeder shown in Figure 29;

Figure 31, a front elevational view of the cam drive mechanism; and

Figures 32, 33, 34 and 35, side elevational views of the cams taken along the lines 32, 33, 34 and 35 of Figure 31.

With reference to Figures 1, 2 and 3 of the drawings, the numeral 1 designates uprights for supporting a base or table 2, the uprights being connected by cross-pieces 3 and a motor base 4, Figure 3, to constitute it a rigid structure. The operating mechanism such as the chuck mechanism generally designated by the numeral 5 and the honing head generally designated by the numeral 6 are mounted on top of the base plate 2, as shown in Figures 1 and 2, and the drive mechanism and cam operating mechanism, together with the drive motor and clutches, are mounted below the base plate 2, as shown in Figure 3. A feed mechanism generally designated by the numeral 7, is disposed between the chucking mechanism and the honing head 5 and 6, respectively, as shown in Figure 1.

The chucking mechanism consists of a pillow block bearing 8 secured by flanges 9 and bolts 10 to the base plate 2, Figure 1. A spindle housing 11 is connected by a web 12 forming a yoke with bearing elements 13 and 14 for a spindle 15 journaled in bearing 16 of the bearing block 8. A counterweight arm 17 with adjustable counterweight 18 extends from the yoke element 13 to constitute the spindle housing 11 a more or less floating member operable between a set of adjustable screws in a manner to be hereinafter explained in connection with Figure 7 of the drawings. The spindle housing 11 contains a hollow spindle 19, Figure 4, journaled in ball bearings 20 and has a flange 21 that is provided with bolts 22 having a body milled portion 23 extending through a spring chuck or collet 24, the chuck being provided with angularly spaced slots 25, as shown in Figures 4 and 6. The heads 22a of bolts 22 act as stops for chuck 24. There are two or more bolts like the bolt 22 and there are a plurality of coil springs 26, Figure 4, disposed in spring seats formed in chuck housing 27 and the spring chuck 24, as shown, to yieldingly urge the spring chuck 24 away from the chuck housing 27.

The spring chuck 24 is provided with a tapered outer surface 24a and the chuck housing 27 is provided with a tapered inner surface 27a, the latter being grooved for receiving a rubber O-ring 28. The spring chuck 24 is provided with a hub portion 29 that constitutes an end abutment for a cup shaped ram 30 that is secured to the the end of a spindle 31 by a nut 31a. Spindle 31 is mounted for sliding movement in hollow spindle 19. A coil spring 32, Figure 5, rests against an end plate 33 and a thrust plate 34. The thrust plate 34 is provided with a bearing surface 35 against which a pair of rollers 36 and 37, Figure 2, ride under pressure of a bell crank lever 38 which is actuated in a manner to be hereinafter explained.

Again referring to Figures 1, 2 and 5 of the drawing, the hollow spindle 19 is provided with a sheave wheel 39 that is connected by a belt 40 to a sheave wheel 41 that is driven by a motor 42 through a gear reduction unit 43, Figure 4. As shown in Figure 4, the spring chuck 24 is adapted to grip the cup 44 of a roller bearing, the chuck being recessed at 44a to engage the end face and the outer periphery of the cup 44, as shown in Figure 4. Coil spring 32, Figure 5, normally retracts the chuck 24 against pressure of coil springs 26 by means of the ram 30 and when the chuck is retracted, it bears against the O-ring 28 and its angularly spaced fingers or jaws between slots 25 contract to grippingly engage the cup 44. When the shaft 31 is displaced by the rollers 36 and cam lever 38 acting on thrust plate 34 and moved in the direction towards the right, as viewed in Figure 4 of the drawing, against the pressure of coil spring 32, springs 26 of which there are three or more, will move the chuck 24 out of contact with the O-ring 28 and permit the fingers to expand, thereby releasing the bearing cup or shell 44. The cup-shaped ram 30 on the shaft 31 will engage the back of cup 44 and push it out of the chuck 24.

The means for feeding the bearing cups to and away from the chuck will now be described in connection with Figures 1, 14, 15, 16 and 29 and 30 of the drawings. The feed mechanism may be designated a center board feeder and is generally marked by the numeral 7 in Figure 1 of the drawing. As shown in Figures 29 and 30, it consists of a pair of spaced plates 45 and 46 having a stop 46a at the top to form a runway. A center board 47, movable on a pivot 48, is disposed between plates 45 and 46. The center board is subjected to pivotal movement by a cam operated rod 49, Figures 14 and 29, that is connected to the center board by a bolt 50. A spring 51 connected to a depending member 52 of the center board and attached at one end to a stationary bolt 53 normally biases the center board 47 in an upward direction. The center board is provided with a stop plate 54 which, in its lower position, has its upper edge 55 in register with the runway 56 provided between the side members 45 and 46. This runway supports the cup members 44 shown in dotted lines as rolling down the track and butting the stop 54.

When the center board 47 is lowered by the cam arm 49 to where the top of the stop plate 54 registers with the runway 56, a cup or bearing shell 44 will roll against the roller 57 and when the center board is raised the shell will roll against a stop 58 on the center board and a fixed stop 58a. Stops 58 and 58a are guage points for centering the cups 44 with the chuck 24. To speed up the feeding operation, an adjustable set screw 59 is provided with a pointed end 60 that engages the outer periphery of the bearing cups 44 as the center board 47 rises and snaps them into the position against the stop 58.

The cups 44 resting against stops 58 and 58a are engaged by a paddle 61 which is more clearly shown in Figures 15 and 16. The paddle moving in the direction of the arrow, as shown in Figure 15, engages the cup 44 and pushes it into the jaws of the spring chuck 24. The paddle 61 is operated by an arm 62 mounted on a link 63 pivoted at 64 and actuated by a lever 65 pivotally connected to the arm 62 at 66 and to the bearing block 5 by the bolt 67, as shown in Figure 2. The link 63 and arm 65 effect a parallel movement of the arm 62 so that the paddle moves square against the face of the bearing cup 44. As shown in Figures 14 and 15, the lever 65 is provided with a cam face 68 which rests against a follower 69 mounted on a cam lever 70. A spring 71 is connected to an extension 72 of lever 65 by a screw 73 and is connected to the cam lever 70 by the screw 74. By means of the spring tension holding lever 65 against the follower 69, the paddle 64 is resiliently mounted to keep tension on the bearing cup 44 in the same manner as if they were fed into the spring chuck 24 by hand.

Again referring to Figure 29, the bearing shell 44, after being discharged by the ram 30 from the chuck, as shown in Figure 4, slide down incline 75 between side walls 75a and 75b, Figure 1, to a discharge track 76.

The honing head will now be described in connection with Figures 1, 2, 7 to 13, and 18 to 28, inclusive, of the drawings. The honing head generally designated by the numeral 6, Figure 2, is mounted in a quill 77, Figure 1, supported in a slide box 78 movable in a slide frame 79, as is more clearly shown in Figure 18. The slide box 78 is adjustable by a screw 80 and is locked by a screw 81. The slide frame 79 is secured to a slide block 82 having slideways 83 of V shape that are engaged by complementary shaped rollers 84 that are supported on an inclined base 85, as shown in Figures 18 and 20, the inclined block 85 being secured to the base plate 2 by bolts 86. As shown in Figures 19 and 21, the blocks 85 carrying the rollers 84 may be adjusted by a bolt 87 having a spacer sleeve 88 disposed thereon, the spacer sleeve being disposed between the inclined blocks 85, as shown in Figure 21. The bearing tension of the rollers on the guide ways 83 of the slide block 82 can be adjusted by grinding or filing off the end of the sleeve 88 and drawing up on the nut 89 of the bolt 87. The quill 77 and its assembled mechanism is shown in detail in Figures 8 and 9 of the drawings. It is provided with a flange 90 recessed to receive a fly wheel 91 that is mounted on a spindle 92 journaled in quill 77 by bearings 92a and 92b and having a sheave wheel 93 by which it is driven by a belt 94 extending through a slot 95 in the base plate 2, the belt being connected to a motor 96, Figure 3, mounted below the base plate 2. The flange plate 90 carries rollers 97, Figures 8 and 10, to guide a shuttle arm 98, there being four rollers, as shown in Figure 8. The flange plate 90 is provided with graduations 100, Figure 8, and is provided with slots 101 and clamping bolts 102 by means of which it may be angularly adjusted in degrees within the limits of the graduations 100 marked from 0 to 20.

The shuttle head is adjusted to the angle of the surface 44b of cup 44 to be honed and when the head is adjusted the entire mechanism of the plate 114, as well as that of the shuttle head and arm 98, are moved bodily without changing their relative positions.

As shown in Figure 9, shuttle arm 98 is a two-piece member separated by spacing collars 103 and secured by bolts 104. Within this arm there are mounted a guide roller 105, a honing shoe 106, Figures 8 and 9, and a pair of guide rollers 107 and 108 around which passes an abrasive faced tape. Also within arm 98 is mounted a crank 109 and a connecting rod 110. The fly wheel 91 is counter-balanced by cutting holes 111 around the outer periphery thereof, as shown in Figure 9.

As will be seen in Figure 9, the crank is movable in the space 112 of the arm 98 and the connecting rod is mounted on a roller 113 which extends through the arm 98 and the latter is driven by crank 109 to produce a shuttle or oscillating movement lengthwise of the arm 98 between the supporting rollers 97.

As shown in Figure 22, a plate 114 for mounting an abrasive faced tape for the honing machine is provided with an opening 115 for mounting on the quill 77 and is provided with slots 116 corresponding to the spacing of the bolts 102, Figure 8, for securing the plate 114 on the quill flange 90. A pin 117 that fits in the opening 118 of flange 90, Figure 8, locks the plate against movement on the head.

A reel 119 for mounting a roll of honing tape 120 having an abrasive on one face thereof is mounted to be freely rotatable on stud shaft 121 secured to the plate 114. An arm 122 pivoted at 123 and having a flanged end overlapping the width of the tape rests on the shaft 121 and prevents the honing tape, which is designated by the numeral 124, from coming off the end of the roll. A rewind reel 125 is mounted on a stud shaft 126 which has a spool 127 with a slot 128 for receiving the end of the tape 124 for rewinding the same. The tape 124 passes under a tension roller 129 mounted on an arm 130 pivoted at 131 and biased by a coil spring 132 to maintain suitable tension on the honing tape. The tape passes over a knurled wheel 133 which is more clearly shown in Figure 26 of the drawing, the knurled surface providing traction to prevent slipping of the honing tape. Also the wheel 133 is provided with flanges 134 to track the tape, wheel 133 being free running. A friction plate 135 is provided to engage one face of the wheel 133 by action of spring 135a to assert a dragging action on the wheel 133 and on the tape.

The tape passing over wheel 133 is looped under the wheel 107 carried by the shuttle arm 98, Figure 8, then passes over the guide wheel 105 and under the shoe 106. It then loops under guide wheel 108 and passes upward around the guide wheel 136, Figure 22, more clearly shown in Figure 26, the wheel 136 having flanges to track or guide the tape.

By bringing tape to shuttle arm 98 at right angles to the mean position of the stroke of oscillating movement, namely by passing tape 124 over roller 133 and to rollers 107, 105, 108 and roller 136 and if the distance from rollers 133 to 107 and 136 to 108 is long enough to maintain the acute angle of the triangle a minimum there is very little difference between the longest side of the right angle, e.g. the distance between rollers 133 and 107 and the hypotenuse determined by the length of stroke of the shuttle bar 98 which is a fraction of an inch to insure substantially constant tension on tape during oscillation of shuttle arm 98 without stress.

Honing tape 124 thence passes to the feed mechanism which is a somewhat complex structure shown in detail in Figures 24, 25, 26, 27 and 28 of the drawings. It consists of a spindle 138 that has a wheel 139 with a hub portion 139a mounted on a key 140, wheel 139 being secured to the spindle 138 by a washer and nut 141 and 142, respectively. The wheel 139 carries a ratchet wheel 143 which is fastened by the bolts 144. A hub member 145 is mounted on spindle 138. It is provided with a flanged portion 146 that is riveted to the assembly plate 114 as shown in Figure 24. Journaled on the member 145 is a cylindrical member 147 having a reduced end portion that is knurled, as shown at 148, for engaging the tape 124. This portion is secured by screws 149 to a ratchet wheel 150, which is engaged by pawls 151, there being three pawls, as shown in Figure 27, the engaging tooth portions of which are staggered one-third the pitch of the teeth 152 of the ratchet wheel 150 so that the wheel will be engaged by a pawl in increments of movement of one-third of the pitch of the teeth 152. By the use of three staggered pawls, as shown, the need for small fine pitch teeth is eliminated and a more substantial and stronger tooth 152 may be employed and still give the ratchet wheel an indexing movement of three times the number of teeth. As shown in Figure 24, the pawls are mounted on a pin 153 that is fixed to the hub 145.

The tape 124 is pressed against the knurl 148 of the sleeve 147 by an idler wheel 154 that is mounted on an arm 155 pivoted to plate 144 by a pin 156, the arm 155 being biased by a coil spring 157 to hold the wheel 154 against the tape on the sleeve 147 to maintain tension on the tape. The honing tape 124 has an abrasive face on one side and a smooth face on the other and its contact with the rollers and shoe 106 is on the smooth side only.

The feed mechanism shown in Figure 24 is actuated by a gear and rack shown in Figures 24 and 28. The gear 158 is journaled on a neck or shoulder portion 159 of the wheel 160 that carries the ratchet pawl 161. The pawl is biased by a spring 162, Figure 28, to engage the teeth of the ratchet wheel 143, Figures 24 and 28. The pawl, by engaging the teeth of the ratchet wheel 143, will rotate the wheel and cause the spindle or shaft 138 to revolve and thereby rotate the feed mechanism of the honing tape by virtue of the fact that the shaft 138 is provided with an integral flange 163 that has a pin 164 that engages the tape feeding wheel 147. As shown in Figure 25, the rewind reel 125 is actuated by an endless spring or garter belt 165, Figure 24, that passes over the wheel 166, Figure 25, that is attached to shaft 167 on which the rewind reel 125 is mounted and secured by a set screw 168. The gear wheel 158 is rotated to advance the honing tape to renew the grit surface of tape 124 passing under the honing shoe 106 after each honing operation on an anti-friction bearing cup, such as the cup 44 shown in Figure 22. This is accomplished by the gear rack 169, Figure 28, engaging the teeth of wheel 158. The rack 169 forms an extension of a lever 170 to which it is attached by screw bolts 171, lever 170 being pivoted at 172 on an adjustable slide bracket 173 mounted on a bar 174. The latter is fixed to bracket 175 which, as shown in Figure 1, is secured to the base plate 2. The arm 170 is biased by a coil spring 176 to have its teeth bear against the teeth of gear wheel 158 and when slide block 82 is moved on its inclined base 85 the gear wheel will rotate while rolling on rack 169 to actuate the tape feeding mechanism.

The cam mechanism and drive will now be described in connection with Figures 3, 14, 15 and 31 to 35 of the drawings. In Figure 3 a cam shaft 177 is provided with a sprocket wheel 178 driven by a chain 179 through a transmission box 180 connected to the cam drive motor 181. Cam plates 182, 183, 184 and 185, Figure 31, are mounted on the shaft 177. Shaft 177 is journaled in bearings 186 and 187 suspended by plates 188 and 189 welded to the base plate 2. The cam shaft 117 is provided with a gear wheel 190 that is driven by a pinion 190a, shown in Figure 14 of the power shaft 191. This shaft is provided with an overload clutch 192, Figure 3, having a clutch engaging mechanism 193 operated by lever 194 that extends above the base plate 2, as shown in Figures 2 and 3.

As shown in Figures 31 through 35, inclusive, the cam wheels 182, 183, 184 and 185 are provided with cam plates 195, 196, 197 and 198. These cams' faces are engaged by followers to operate the cam levers shown in Figures 3 and 14 of the drawings. Thus cam 196 is engaged by follower 199 on the bell crank lever 38 to operate the shaft 31 with the ram 30 that discharges the cup 44 from the spring chuck 24. The follower 199 is pressed against the face of the cam by coil spring 32 on shaft 31.

The operator bar 49 for operating the center board 47, Figure 29, is operated by a bell crank lever 200 having a follower 201 that engages cam 198. The movement of the center board operating bar 49 can be adjusted by the nuts 203 of Figure 14. As appears from Figure 29 of the drawings, coil spring 51 raises the center board 47 which will pull the operating arm 49 upward so that the washer 204 contacts the rounded end 205 of the bell crank lever 200. The center board is therefore directly responsive to the movement of the bell crank lever 200 as it follows the cam 198.

The lever 206 extends through a slot 207 in the base plate 2, Figure 14, and is provided with a roller 208 that engages the underside of the slide block 82 that moves between the rollers 84 as shown in Figures 14 and 19. The roller 208 is lodged in a slot in the slide block 82 to cause the latter to slide back and forth on the roller 84 supported on the inclined base 85 in response to movement of cam 197, Figure 34 and Figure 3, the follower 209 of lever 206, Figure 14, not being shown in Figure 3 of the drawings. It will be noted that the cam operated lever 206 has an arm 206a that abuts an adjustable nut 211 on a threaded rod 210. Arm 206a is connected by an adjustable screw 212 to a coil spring 212a that holds follower 209 against cam 197 to thereby move slide block 82 in the direction of the chuck 24 during the dwell of the cam.

The purpose of the inclination of the slide block 82, as shown in Figure 18, is to bring the abrasive surface of the tape 124 under the honing shoe 106 into contact with the tapered face 44b of the cup, Figure 4, in a manner to cause the abrasive surface of the honing tape to be applied to the surface 44b to be honed in a radial direction, or in other words, to cause it to seat thereon instead of sliding on the surface from the edge of the cup which would cut or injure the tape. As shown in Figures 11, 12 and 13, the shoe 106 is provided with serrations or grooves 106a, Figures 11 and 12, that extend along the entire face of the shoe. In Figure 13, however, the serrations extend only a fraction of the length of the shoe as indicated by the reference character 106b, Figure 13. The purpose of the serrations or grooves is to effect a non-slipping and somewhat yielding contact of the shoe with the smooth or non-abrasive side of the honing tape 124. By the use of the serrated surface of Figure 13, only a small portion of the honing tape under the shoe is brought in contact with the surface 44b of the bearing cup 44. In this way only the portion of the honing tape engaged by the fractional serrated surface 106b is subjected to wear and a 150-ft. roll of tape will hone many times the number of bearing cups as it would where the entire surface of the shoe involved in the honing operation by a fully serrated shoe as in Figures 11 and 12.

In Figure 31 the uprights 1 supporting the base plate 2 are shown as provided with adjustable feet 1a by which the base plate 2 can be leveled. In Figure 7 the spindle housing 11, Figure 4, is pivoted on shaft 15 and is counterweighted at 18, as described in connection with Figure 1 of the drawing. Figure 7 shows the spindle housing 11 provided with a lug 11a disposed between two adjustable set screws 11b and 11c. These screws may be set to lock the housing 11 or they may be separated slightly to provide floating clearance for the housing and the chucking mechanism. Also the spindle 11 is shown as welded to a slide plate 11d movable on the arm 11e that carries the adjusting set screws. The need for the floating clearance is determined by the size of the work being honed and counterweight 18 is adjusted to bring about the floating action.

The operation of the above-described mechanism is briefly as follows:

As shown in Figure 4, the cup or outer race of a roller bearing designated by the numeral 44, is gripped by the spring fingers or jaws of the chuck 24. The spring 32 retracts the cup-shaped ejector or ram 30 and displaces the chuck jaws axially to contact the rubber O-ring 28 which causes the jaws to close to grippingly engage the race or cup 44. The rubber O-ring assures uniform gripping action of all of the jaws of the chuck simultaneously and eliminates chatter. As the chuck is closed by retraction of the shaft 31, springs 26 are compressed and by action of the cam lever 206 the honing head slide 82 is moved forward down the inclined bearing wheels 84 to effect contact of the honing shoe 106 with its honing tape on the surface 44b of the cup 44, as shown in Figure 22. At the same time the motor 96 will drive belt 94 to rotate sheave wheel 93 that drives spindle 92 and causes the crank 109 to operate the connecting rod 110 and cause the shuttle arm 98 to reciprocate between the wheels 97 whereby the honing shoe 106 and the honing tape contacted thereby will hone the surface 44b of the cup 44. The total movement of the honing shoe 106 or shuttle arm 98, is not more than approximately ⅛ of an inch and the surface texture of the finish of surface 44b may be controlled by controlling the speed of rotation of the chuck and the rapidity of oscillation of the shuttle arm 98. The oscillatory movement of the shuttle arm may also be varied by varying the throw of the crank 109.

As the shuttle arm is retrieved or moved out of honing position by the cam operating lever 206 and cam 197, the entire honing head including plate 114 that carries the feed mechanism, is retracted causing the gear wheel 158 to rotate by virtue of its engagement with the teeth of the rack 169. Wheel 158 will drive the ratchet pawl 161 to engage the ratchet teeth of wheel 143 and rotate wheel 139 and spindle 138 which, as is shown in Figure 24, will rotate wheel 147 on which the tape 124 is looped. Wheel 147, by virtue of its knurled surface and the tension applied to the tape by means of roller 154 will revolve and the pawl and ratchet wheel 150 and 151 will hold the tape in its advanced position. At the time of rotation of shaft 138 the rewind reel 125 will be driven by the spring chain 165 engaging wheel 166, Figure 25, to take up the loose or advanced portion of the tape. By means of these sequential operations the tape is indexed in small increments to pass under the shoe 106 to present a new and fresh abrasive surface for engagement with the bearing surface 44b of the cups 44.

With reference to the feeding mechanism, as shown in Figures 29 and 30, the cups 44 move down the incline or track 56, as shown in dotted lines in Figure 29, and are fed by the center board 47 to the front portion of the chuck 24 where they are moved into the chuck jaws by the paddle 61 when the paddle actuating lever 65 is energized by the cam 195. When the paddle is retracted by cam action and the finished honed cup 44 is ejected, it will roll down the incline 75 to the discharge track 76.

Honing by the use of an abrasive surface is done to not only polish the surface of the roller race or cup that is engaged by the anti-friction roller, but its primary object is to change the surface texture to eliminate the concentric rings that have been formed by the grinding wheel. The contact of the abrasive surface of the honing tape by reciprocating movement of about 800 reciprocations per minute and the control of the rotating speed of the chuck that holds the cup 44 will effect a cross hatch texture of the honed surface that substantially eliminates the concentric rings caused by the grinding operation. Also, this honing process will produce a surface smoothness of between 1½ to 3 micron inches where the original grinding finish may have been from 8 to 12 micron inches.

Although the invention has been demonstrated as particularly useful in honing the races of anti-friction bearings, it is evident to those skilled in the art that it may have many others applications for changing surface textures. It is also apparent that many modifications may be made in the details of construction without departing from the principles herein set forth.

Some of the advantages afforded by the above-described tape honing mechanism is that it will hone dry and without coolants or lubricants which are costly and difficult to remove after honing. It is evident, of course, that it could be used with water if desired. Another feature is that the honing is done with very light pressure in terms of ounces rather than the usual pounds and this reduces the possibility of displacing the cup and getting it off square in the chuck. By holding the cup firmly in the chuck with a gripping action as distinguished from the conventional way of supporting them on drive rolls, run-out conditions and wobbling of the cups are avoided.

An outstanding feature of the invention is that the abrasive tape is advanced by a positive feed mechanism rather than through the rewind reel on which the tape constantly increases in size which would increase its pull at each successive index.

The adjustability of the honing head through an angle of 20° makes the machine universal for use with cups of any angle of bearing face.

Mounting the shuttle on an inclined base prevents tearing of the honing tape by edge contact if the tape were moved in from the edge of the cup. These and other advantages are evident from the foregoing disclosure.

I claim:

1. In a machine for honing the cups of roller bearings, means for feeding the cups to a plurality of gauge points in front of a chuck including an inclined track having side and top guide walls for rolling the cups to a stop and a center board hinged for angular movement between said walls, said center board having a stop for intercepting the cups in the raised position of the center board, a roller stop in the path of movement of the rolling cups for lifting the cups to a position in alignment with the chuck, and gauge blocks for engaging the cups in register with the chuck and in alignment with the chuck loading means, said center board when raised discharging the cup to a delivery track.

2. Apparatus as set forth in the next preceding claim in which the chuck comprises a cylindrical spring collet having a conical face mounted for axial movement in a cylindrical housing having a complementary conical face for engaging the collet to contract the same, and a ring of resilient material mounted in the conical face of said housing to exert uniform pressure on the engaging face of said collet.

3. In a tape honing mechanism a support for mounting the work to be honed including means for subjecting the work surface to suitable speeds for honing, an angularly adjustable support for mounting and feeding honing tape having a shuttle arm mounted for oscillating movement therein, a honing shoe mounted in said arm, rollers in said arm guiding the honing tape across the contact face of said shoe and means for feeding the tape to said guide rollers and across the face of said shoe.

4. A tape honing mechanism comprising an inclined base, a frame mounted for sliding movement on said base, a head for supporting a shuttle arm mounted in said frame, a shuttle bar mounted for oscillating movement in said head having an extension in the direction of the downward movement of the frame on said inclined base, said head being adjustable angularly to vary the degree of inclination of the shuttle arm, a honing shoe mounted in said arm, rollers in said arm guiding the honing tape across the contact face of said shoe and means for feeding the tape to said guide rollers.

5. A tape honing mechanism as set forth in claim 4 in which the shuttle arm is mounted between spaced guide rollers and is actuated by a crank to oscillate in said rollers in response to movement of said crank and a fly wheel for counterbalancing said shuttle arm in its oscillating movements.

6. A tape honing mechanism as set forth in claim 4 in which the shuttle arm is a two-piece member having spacing collars therebetween to constitute a pair of rail guide rollers having shoulders engaging said rails, a crank disposed between said rails and a connecting rod engaging said crank and mounted between said rails to impart oscillating movement to said shuttle arm.

7. A tape honing mechanism as set forth in claim 3 in which the means for feeding the honing tape comprises a plate mounted on the angularly adjustable support to be movable therewith, a supply reel for the honing tape, a re-wind reel therefor, a guide roller for directing the tape from the supply reel to the guide rollers in the shuttle arm, a guide roller for directing the tape away from said shuttle arm guide rollers, a feed mechanism having rolling contact with the tape and actuating means for moving the tape in increments to renew the abrasive surface of the tape passing under the honing shoe.

8. A tape honing mechanism as set forth in claim 3 in which the means for feeding the honing tape comprises a plate mounted on the angularly adjustable support to be movable therewith, a supply reel for the honing tape, a re-wind reel therefor, a guide roller for directing the tape from the supply reel to the guide rollers in the shuttle arm, a guide roller for directing the tape away from said shuttle arm guide rollers, the tape passing under the last-named guide rollers to a guide roller at the end of the shuttle arm at a right angle, and the spacing of the guide rollers on the shuttle arm from the guide rollers on said plate being such that the tape therebetween is of a length to obtain a minimum acute angle with the long side of the triangle substantially the same as the hypotenuse at the end of shuttle bar oscillatory movement to thereby maintain substantially constant tension on the tape without strain.

9. A tape honing mechanism as set forth in claim 3 in which the means for feeding the honing tape comprises a plate mounted on the angularly adjustable support to be movable therewith, a supply reel for the honing tape, a re-wind reel therefor, a drag roller mounted on said plate for guiding the tape from the supply reel to the shuttle arm guide rollers, a tension device for drawing the tape against the face of the drag roller, a guide roll for receiving the tape leaving the shuttle arm guide rollers and a feed mechanism comprising a reel over which the tape passes with tension means to maintain contact of the tape therewith, said reel being rotatable with the shaft having a gear wheel, a gear rack having teeth engaging said gear wheel and being disposed in the path of movement of the honing mechanism on its inclined base to rotate said wheel, a ratchet wheel connected to said gear wheel and being mounted on the feed reel shaft to rotate the same and a ratchet wheel carried by the tape reel having ratchet pawls in engagement therewith whereby on rotation of the gear and rack the tape feed reel will advance in increments, said feed mechanism being connected with the re-wind reel to re-wind the tape on said reel as it passes from the feed mechanism.

10. In a tape honing machine, a support for mounting the work to be honed including means for subjecting the work surface to suitable speed for honing, a support for mounting and feeding honing tape with an abrasive surface exposed to the surface to be honed, said tape mounting and feeding means including a honing head mounted for movement to and away from the work, said head having a shuttle arm mounted for reciprocatory movement independently of the movement of said head, said arm having means for engaging the tape and holding it against the surface to be honed, and means for advancing and guiding the tape to travel across said tape engaging means.

11. A tape honing machine as set forth in claim 10 in which the tape feeding means is operative to advance the tape in small increments to renew its honing surface between successive honing operations.

12. A tape honing machine as set forth in claim 10 in which the tape feeding means is operative in response to movement of said honing head to advance the tape in small increments to renew its honing surface between successive honing operations.

13. A tape honing machine as set forth in claim 10 in which the means for holding the tape against the surface to be honed consists of a shoe having serrations for distributing pressure evenly on the portion of the tape in contact therewith.

14. In a tape honing machine as set forth in claim 10, a shuttle arm mounted for oscillating movement above the work to be honed, means for mounting the honing tape on said arm including means for guiding the tape to pass beneath the arm in contact with the face to be honed, said mounting means including guide rolls arranged so that the tape is fed from one side of the arm to the honing face of the arm and back in the direction from which it is fed so that a continuous ribbon of tape can be fed in step-by-step increments as the abrasive surface of the tape makes successive contact with the work.

15. In a tape honing machine as set forth in claim 10, a shuttle arm mounted for oscillating movement above the work to be honed, said arm having a shoe mounted for engaging the non-abrasive surface of the honing tape and apply the tape to the work, guide means including a guide roller in front of said shoe and a plurality of guide rollers mounted on said arm at the rear of said shoe, said guide rollers being spaced to guide the tape from a source of supply to the front of the arm and to cause it to fold back upon itself and pass beneath the shoe to one of the rear guide rolls.

16. In a tape honing machine as set forth in claim 10, a shuttle arm having a honing shoe mounted to be self-aligning with the surface of the work to be honed and means for feeding a honing tape across the face of the shoe with the abrasive surface of the tape exposed to the work, the tape engaging face of said honing shoe having serrations bearing on the tape to track the tape across the shoe and to distribute the honing pressure of the serrated area on said tape, said feeding means being operative to move the tape underneath the shoe a distance corresponding to substantially the area covered by the serrated bearing surface of said shoe.

References Cited in the file of this patent

UNITED STATES PATENTS

| | | |
|---|---|---|
| 294,766 | Coy | Mar. 11, 1884 |
| 296,535 | Coy | Apr. 8, 1884 |
| 1,036,783 | Bein | Aug. 27, 1912 |
| 1,253,080 | Morreau | Jan. 8, 1918 |
| 1,576,589 | Flaherty | Mar. 16, 1926 |
| 1,974,806 | Curtis et al. | Sept. 25, 1934 |
| 2,061,607 | Andrie | Nov. 24, 1936 |
| 2,139,896 | Johnson | Dec. 13, 1938 |
| 2,165,616 | Cox | July 11, 1939 |
| 2,284,556 | Brackett | May 26, 1942 |
| 2,448,393 | Reynolds | Aug. 31, 1948 |
| 2,624,160 | Harper | Jan. 6, 1953 |